United States Patent Office 3,480,950
Patented Nov. 25, 1969

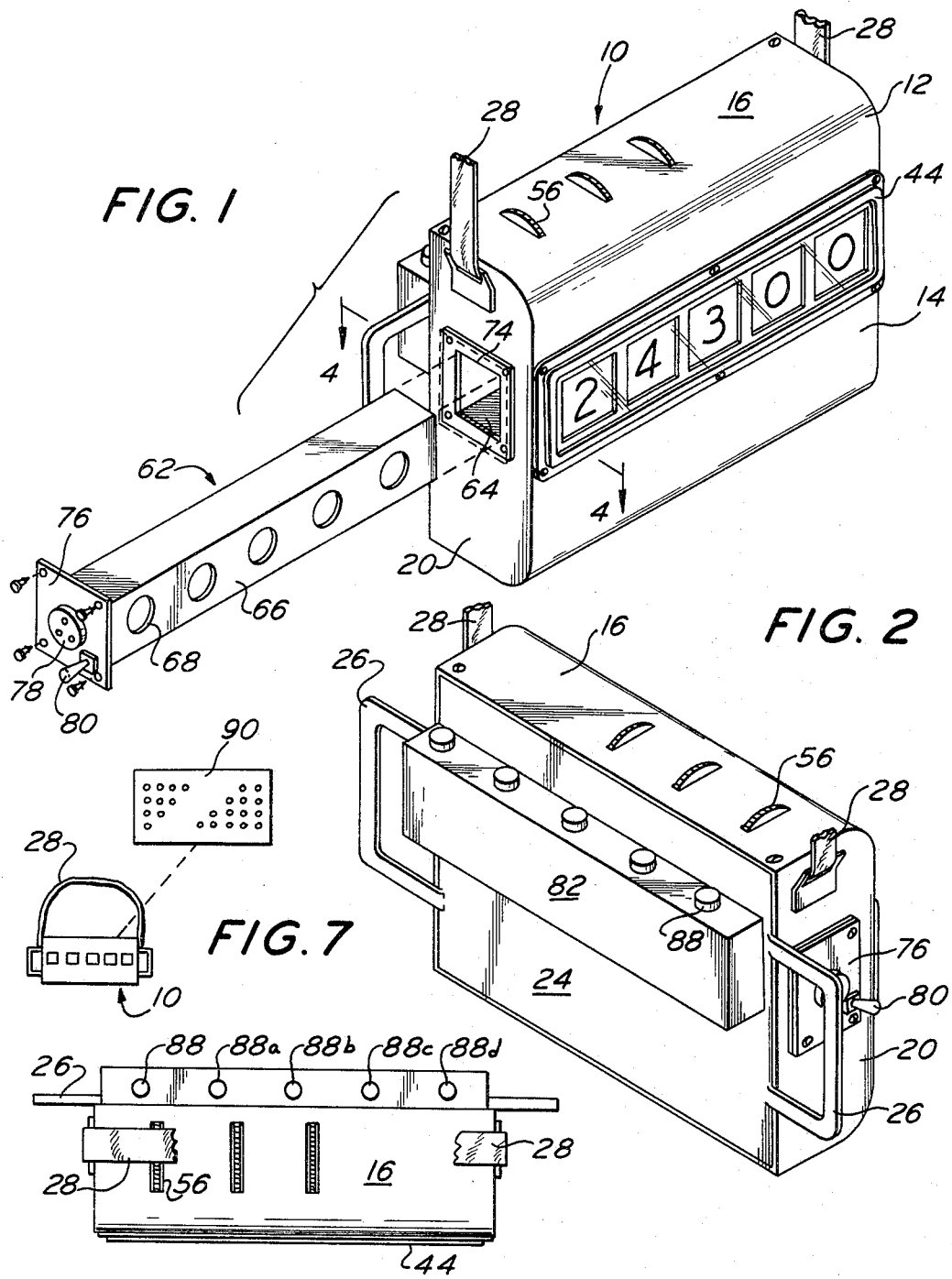

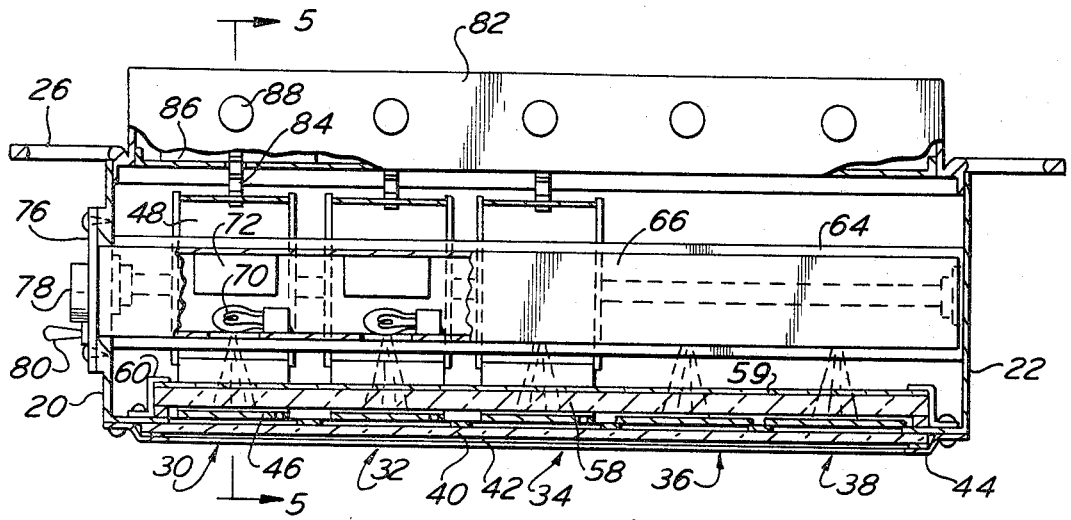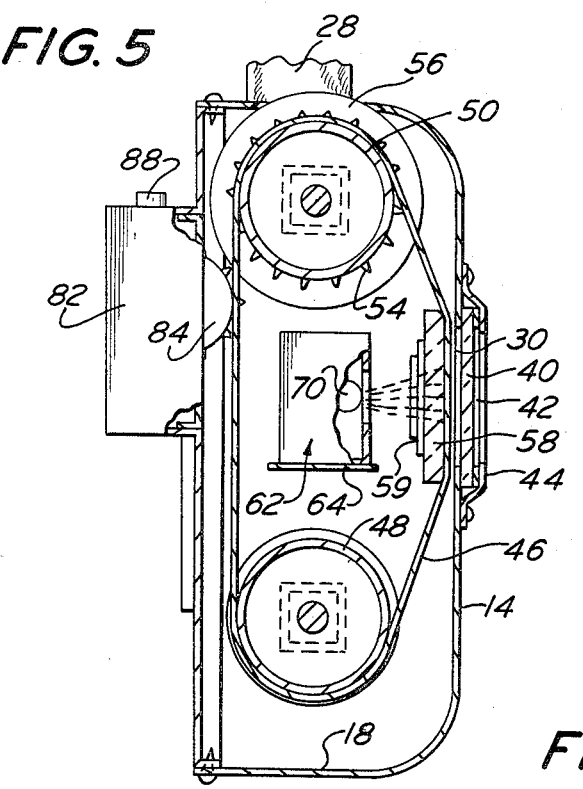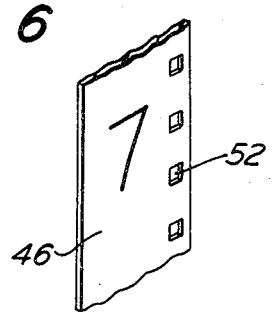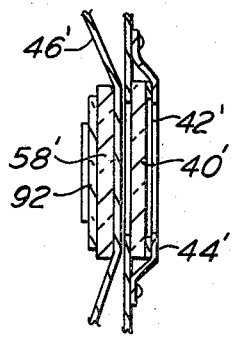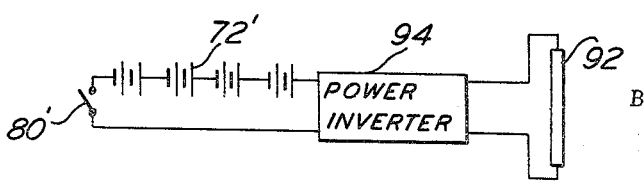

3,480,950
DIGITAL INDICATOR
Isadore B. Rachman, Philadelphia, Pa., assignor to Metal Dynamics Corporation, Philadelphia, Pa., a corporation of Pennsylvania
Filed Jan. 11, 1967, Ser. No. 608,538
Int. Cl. G08b 5/00
U.S. Cl. 340—378       6 Claims

ABSTRACT OF THE DISCLOSURE

A digital indicator is provided in the form of a portable housing having a plurality of windows for exhibiting selectively variable indicia. When the proper indicia are exhibited, a wireless signal may be transmitted to a remote receiver adapted to exhibit the corresponding indicia on a light board.

---

The present invention is directed to a digital indicator which has a variety of uses. For purposes of illustration, the indicator of the present invention is described as having utility in connection with operations of the catapult on an aircraft carrier. The indicator is in the form of a portable housing having selectively adjustable means for exhibiting indicia to a pilot who is ready to take off from the aircraft. When the proper indicia are exhibited indicative of the weight of the airplane, a signal is given by the pilot to the person wearing the indicator that he may now transmit a signal to the person in charge of setting the pressure for the catapult. The signal transmitted to the catapult operator is indicative of the weight of the airplane. The pressure of the catapult must be adjusted so as to correspond to the weight of the airplane. A failure to properly adjust the pressure of the catapult may result in the airplane being lost over the side of the aircraft carrier.

The selectively adjustable means within the housing as disclosed herein includes movable endless belts. The endless belts are preferably made from Mylar having white figures from 0 to 9. The housing has a large window or a plurality of small windows. A selectively adjustable operator in the form of a knob is associated with each tape for moving it. A light source is provided within the housing in a location so that the endless tapes have a portion disposed between a window and a light source.

As illustrated herein, the light source includes a plurality of rechargeable batteries and lamps such as light bulbs. In an alternative embodiment, the lamps are in the form of an electro-luminescent panel. When using light bulbs, the light bulbs are preferably spaced from the endless tapes by a red filter and a light diffuser. The use of a red filter is preferable when the present invention is used on aircraft carriers since the eyes of the pilot are conditioned to red light.

It is an object of the present invention to provide a novel digital indicator.

It is another object of the present invention to provide a digital indicator which is adapted to be used on aircraft carriers.

It is another object of the present invention to provide a lightweight portable indicator which may transmit a signal to a light panel at a remote location.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is an exploded perspective view of the indicator of the present invention.

FIGURE 2 is a rear perspective view of the indicator of the present invention.

FIGURE 3 is a top plan view of the indicator of the present invention.

FIGURE 4 is a sectional view taken along the line 4—4 in FIGURE 1.

FIGURE 5 is a sectional view taken along the line 5—5 in FIGURE 4.

FIGURE 6 is a partial perspective view of an endless tape.

FIGURE 7 is a diagrammatic illustration of the indicator associated with a light board.

FIGURE 8 is a sectional view of a portion of another embodiment of the present invention.

FIGURE 9 is a schematic wiring diagram for the embodiment shown in FIGURE 8.

Referring to the drawing in detail, wherein like numerals indicate like elements, there is shown in FIGURE 1 a portable digital indicator of the present invention designated generally as 10.

The indicator 10 includes a hermetically sealed housing designated generally as 12. The housing 12 may be made from lightweight, non-corrosive metal or from similar lightweight material such as high impact polymeric plastics. The housing 12 includes a front wall 14, a top wall 16, a bottom wall 18, end walls 20 and 22, and a back wall 24.

Handles 26 are provided at opposite ends of the back wall 24. A carrying strap 28 has its free ends connected to the end walls 20 and 22 by a conventional bracket. The strap 28 is adapted to extend around the wearer's neck so that the wearer's hands are free for a purpose to be described hereinafter.

The front wall 14 is provided with a plurality of windows including windows 30, 32, 34, 36, and 38. A greater or lesser number of windows may be provided as desired. For use on aircraft carriers, the indicator of the present invention is preferably provided with five windows. A clear transparent plastic or glass cover 40 overlies the windows. A gasket 42 overlies the periphery of the cover 40. Cover 40 and gasket 42 are maintained in position over the windows by a peripheral retainer 44.

A selectively adjustable means is associated with at least some of the above-mentioned windows for presenting indicia to be visible through the windows. As illustrated, the means is in the form of endless tapes made from any convenient material such as Mylar having white indicia on a black background. Since the tapes associated with windows 30, 32 and 34 are identical, only the tape associated with window 30 will be described in detail. While the tapes for all of the windows could be identical, for purposes of the present invention, only a small strip of the identical material is used in conjunction with windows 36 and 38. Thus, the strip associated with windows 36 and 38 has indicia thereon which are not selectively adjustable and as shown in FIGURE 1, these indicia are a 0.

The endless tape 46 extends around a driven roller 48 and a driving roller 50. As shown more clearly in FIGURE 6, the tape 46 is provided with perforations along one edge for receiving the projections or teeth 54 on the driving roller 50. A knob 56 is coupled to the driving roller 50 and partially projects up through the top wall 16.

A portion of the tape 46 extends between the window 30 and a milk-white diffuser 58. The diffuser 58 is between the window 30 and a red filter 59. Filter 59 and diffuser 58 are supported within the housing 12 by means of a retainer 60 which partially overlies their periphery.

A source of light is provided within the housing 12 for illuminating the indicia on the tapes and designated generally as 62. The light source includes a generally rectangular housing 66 supported by a shelf 64. The housing 66 is provided with openings 68 at spaced points therealong corresponding to the spacing of the windows. A light bulb 70 is provided within the housing 66 adjacent each of the openings 68.

A plurality of rechargeable batteries 72 are supported within the housing 66. The batteries are connected in series. I prefer to use a rechargeable nickel-cadmium battery. The light bulbs 70 are connected in parallel to the direct current potential provided by the batteries 72. It will be apparent to those skilled in the art that a single large rechargeable battery could be utilized in place of the plurality of small batteries 72. The top wall of the housing 66 is removable to facilitate access to the batteries and lamps therewithin.

The end wall 20 is provided with an opening 74 through which the housing 68 may be inserted and removed. Housing 64 is provided with a flange 76 which is adapted to overlie the portion of wall 20 surrounding the opening 74. Flange 76 is removably connected to the end wall 20 by screws or the like. Flange 76 supports a socket 78 which facilitates coupling an electrical potential to the batteries 72 for recharging the same. Flange 76 also supports a switch 80. Switch 80 is coupled to the battery circuit for turning all of the lamps 70 on and off.

The housing 82 is connected to the rear wall 24 and supported thereby. Housing 82 contains a plurality of conventional variable frequency radio transmitters 86. A sprocket 84 is associated with each of the transmitters 86. Each of the sprockets 84 is meshed with the perforations 52 on one of the tapes 46. Sprocket 84 is connected to the variable capacitor of the radio transmitters for changing the frequency output of the transmitters. Each of the transmitters is provided with an on-off button. The buttons are designated 88, 88a, 88b, 88c and 88d. Each of the transmitters 86 has a different range of frequencies.

A conventional light board 90 is provided at a location remote from the indicator 10. Light board 90 is conventional and comprises a plurality of light bulbs. Certain ones of the light bulbs are caused to be illuminated to thereby spell out indicia such as numbers corresponding to those visible through the windows on the indicator 10 in FIGURE 1.

The indicator 10 may be used as follows:

When an airplane is ready to be catapulted off an aircraft carrier, the person authorizing take-off will be wearing or otherwise supporting the indicator 10 on his person. The person wearing indicator 10 will manipulte the knobs 56 until the indicia visible to the pilot correspond to the weight of the airplane. Every pilot knows the weight of his airplane which will vary with the payload. Due to the fact that the indicia are visible in red, it is easier for the pilot to observe the indicia.

When the pilot consents or otherwise agrees that the indicia exhibited on the indicator 10 are correct, he will signal to the person manipulating the indicator 10. Thereafter, the last-mentioned person will sequentially push the buttons 88, 88a, 88b, etc. The wireless radio transmitters will transmit a signal to a receiver controlling the light board 90 and cause the indicia as observed by the pilot to be repeated on the light board. In the illustrated embodiment, the transmitters associated with windows 36 and 38 will always transmit a signal indicative of a 0. The light board 90 is preferably located near the catapult so that the person adjusting the pressure of the catapult will have a visible signal indicative of the weight of the airplane.

When adjusting the knobs 56 so as to change the indicia capable of being observed through the windows 30, 32 and 34, at the same time the tapes are rotating the sprockets 84 so as to correspondingly adjust the output frequency of the transmitters 86. The transmitters 86 may be solid state transmitters having a limited broadcast range depending upon the remoteness of the light board 90 from the location of transmission.

In FIGURES 8 and 9, there is illustrated another embodiment of the present invention which is identical with that described above except as will be pointed out in detail hereinafter. Hence, corresponding structure is provided with corresponding primed numerals. In the embodiment partially shown in FIGURES 8 and 9, an electroluminescent panel 92 is utilized as the light source. Panel 92 is preferably constructed in accordance with known methods so as to produce or emit a red light which is to be transmitted through the diffuser 58′ and thereby illuminate the indicia on the tape 46′.

As shown in FIGURE 9, the electrical potential from the batteries 72″ is converted to AC by a power inverter 94. The ends of the panel 92 are coupled to the DC source through the power inverter 94. In the same manner as described above, the battery circuit is controlled by switch 80′.

The operation of the embodiment shown in FIGURES 8 and 9 is identical with that described above. Each of the embodiments of the present invention provides a lightweight portable dust and moisture-proof indicator capable of transmitting a wireless signal corresponding to the indica observable through the windows 30–38. While the present invention has been described in connection with a use on aircraft carriers, it may be utilized in other environments where it is desired to have a wireless indicator capable of transmitting signals which are first capable of being confirmed by another person. For example, a party inside of a soundproof room may by looking through a window cooperate with a person wearing the indicator 10 on the outside of the soundproof room. When the proper indicia are exhibited through the windows on the indicator 10, signals may be transmitted as described above indicative of pressure, temperature, liquid levels, etc.

The present invention may be embodied in other specific forms without departing from the spirit or essential attributes thereof.

It is clamed:

1. An indicia indicator comprising a housing, means on said housing to facilitate the carrying of said housing, a plurality of endless tapes located within said housing, a light source located within said housing, said light source being located within the loops of said plurality of endless tapes, each of said plurality of tapes having a plurality of recognizable indicia thereon, said housing having means on one wall defining a window, said plurality of tapes being located between said light source and said window so that the indicia on said plurality of tapes are observable through said window, means on said housing to selectively display each of said plurality of tapes independently of each other so as to exhibit variable indicia through said window, a plurality of radio transmitters, each of said plurality of radio transmitters being associated with a respective one of said plurality of tapes, means to detect which of said indicia on said plurality of tapes are observable through said window, and means including said detection means to selectively actuate said plurality of radio transmitters to transmit signals representative of the plurality of indicia observable through said window.

2. An indicator in accordance with claim 1 wherein said light source includes an electro-luminescent panel.

3. An indicator in accordance with claim 1 wherein at least one of said radio transmitters comprises a wireless radio transmitter having a variable condenser coupled to said selectively adjustable means for transmitting a signal representative of a particular indicia observable through the window.

4. A digital indicator comprising a portable housing having a means thereon to facilitate carrying the same, said means including a carrying strap, said housing having means on one wall defining a window, a battery operated light source in said housing, said light source including a rechargeable battery and a light bulb mounted on a support, said support with battery and bulb thereon being removable as a unit from said housing, selectively adjustable means on said housing for presenting indicia between the light source and the window so that the indicia are observable through the window, said selectively adjustable means including a plurality of endless tapes, each of said endless tapes having indicia thereon in the form of numerals from 0 to 9, means for selectively adjusting each of said tapes, and a red filter disposed between the light source and at least one of said plurality of tapes.

5. An indicator in accordance with claim 4 wherein each of said tapes in Mylar having white indicia on a black background, and a light diffuser between the light source and at least one of said endless tapes.

6. A digital indicator comprising a portable housing having a means thereon to facilitate carrying the same, said housing having means on one wall defining a window, a battery operated light source in said housing, selectively adjustable means on said housing for presenting indicia between the light source and the window so that the indicia are observable through the window, said selectively adjustable means including a plurality of endless tapes disposed side-by-side, a plurality of radio transmitters, each of said tapes being coupled to one of said radio transmitters, means for selectively enabling each radio transmitter to transmit a signal to a remote location representative of an indicia observable through the window, said light source being disposed within the loops of said plurality of tapes, a plurality of knobs on the housing coupled to said plurality of tapes for selectively adjusting the tapes so as to vary the indicia observable through the window, said light source being a self-contained structure removable as a unit and including an on-off switch.

References Cited

UNITED STATES PATENTS

| | | | |
|---|---|---|---|
| 1,661,962 | 3/1928 | Robinson | 178—51 |
| 2,755,457 | 7/1956 | Diemer et al. | 340—202 X |
| 3,386,088 | 5/1968 | Johnston | 340—373 X |

OTHER REFERENCES

Electronics Products Magazine, April 1960, p. 8

JOHN W. CALDWELL, Primary Examiner

M. R. SLOBASKY, Assistant Examiner

U.S. Cl. X.R.

325—111; 340—373